(12) United States Patent
Rodriguez et al.

(10) Patent No.: US 6,519,664 B1
(45) Date of Patent: Feb. 11, 2003

(54) PARALLEL TERMINATED BUS SYSTEM

(75) Inventors: Pablo M. Rodriguez, Burlingame, CA (US); Alper Ilkbahr, San Jose, CA (US); Harry Muljano, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,640

(22) Filed: Mar. 30, 2000

(51) Int. Cl.[7] .................................................. G06F 13/00

(52) U.S. Cl. ...................................... 710/100; 710/305

(58) Field of Search ............................ 710/58, 110, 100, 710/305; 709/201; 712/25; 713/600, 601, 501, 502, 503; 326/86, 90

(56) References Cited

U.S. PATENT DOCUMENTS

| | | | | | |
|---|---|---|---|---|---|
| 5,065,397 | A | * | 11/1991 | Shiobara ...................... | 370/453 |
| 5,349,610 | A | * | 9/1994 | Sakamoto et al. .......... | 375/354 |
| 5,961,649 | A | | 10/1999 | Khandekar et al. | |
| 5,964,856 | A | | 10/1999 | Wu et al. | |
| 6,092,212 | A | * | 7/2000 | Muljono et al. ............ | 709/201 |
| 6,317,801 | B1 | * | 11/2001 | Ilkbahar et al. ............. | 710/110 |

* cited by examiner

*Primary Examiner*—Xuan M. Thai
(74) *Attorney, Agent, or Firm*—Fish & Richardson P.C.

(57) ABSTRACT

A system and method for controlling output buffer drive enable signals on a parallel terminated bus is described. The method includes transferring data between a first agent and a second agent, tracking outstanding data requests from the first agent with at least one synchronous counter, tracking outstanding data replies from the second agent with a source synchronous counter, and driving a signal on the parallel terminated bus when the synchronous and source synchronous counters match.

32 Claims, 14 Drawing Sheets

PARALLEL TERMINATED BUS SYSTEM

BACKGROUND OF THE INVENTION

The invention pertains to an apparatus and technique for operating a computer system. In particular, apparatus and techniques for controlling output buffer drive enable signals on a parallel terminated bus are described.

FIG. 1 is an example of a bi-directional parallel terminated bus system 10. Drivers 12 have an impedance $Z_o$ and are operable to drive a signal on a bus 14 to receivers 16. The bus 14 is terminated at each receiver 16, 18 through a resistor $R_1$ between the bus and the source power supply Voltage $V_s$ and through a resistor $R_2$ between the bus and ground. The bus is therefore biased at a midpoint voltage when not driven by a driver 12. Such a configuration makes the rise and fall times of signals on the bus symmetrical, which is desirable in a source synchronous environment. The parallel terminated bus may be unidirectional, bi-directional or multidirectional.

Any data exchange between drivers and receivers of two entities, such as between a processor and a memory device which may be on separate chips is typically accomplished in a synchronous manner. That is, the chips have internal clocks that are sufficiently in alignment with each other so that data may be acquired on clock signal transitions. In addition, data exchanges may be accomplished source-synchronously, which means that the exchanges are based on strobe signal transitions that have been derived from a clock signal and are synchronized to their corresponding data.

A parallel termination protocol has been developed to ensure correct data signal operation for two or more bus agents across a large operating range. A parallel termination protocol may also be suitable for use with other entities that drive and receive data in a parallel environment. In an implementation, the parallel termination protocol requires that a signal must be driven at all times to prevent a signal from floating to an unspecified logic level. If certain signals such as strobe signals were permitted to float, then the system would become unreliable. Such an occurrence may cause a fatal functional error in the system due to data transmission errors. To avoid such occurrences, the parallel terminated protocol may specify that a bus agent designated as the default bus master will synchronously time the drive cut-off points to occur when another bus agent would drive a signal onto the bus, for example, to return data requested by the bus master. The parallel terminated protocol may also specify that the default bus master is to source-synchronously latch the value on the bus, turn On its drivers, and drive the latched value back onto the bus on the arrival of the last strobe signal for the reply sent by the cache.

Although a parallel terminated protocol for high speed processor systems may readily be defined, a need exists for techniques and apparatus to implement the protocol over a wider range of operating frequencies with cleaner signal transitions.

BRIEF DESCRIPTION OF THE DRAWINGS

FIG. 13 illustrates how the ratio logic controls the flow of data from "Core2Pad" and "SensedPad" to "IO2Pad".

DETAILED DESCRIPTION

Figure 1:
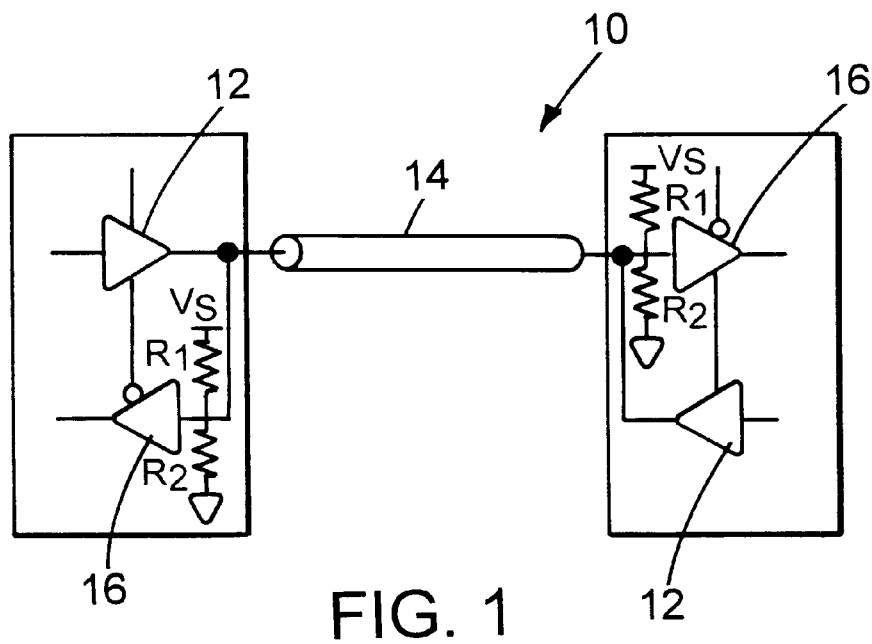
FIG. 1 is a simplified diagram illustrating a parallel terminated bus system.
Figure 2:
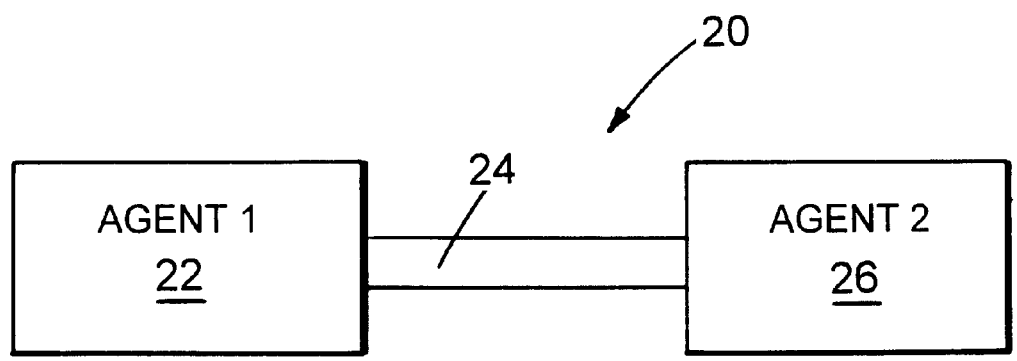
FIG. 2 is a simplified block diagram of a parallel terminated bus system according to the invention.

FIG. 2 is a simplified block diagram of a center tapped terminated system 20 including a first agent 22 connected to a second agent 26 via a parallel terminated bus 24. The first and second agents are capable of driving data, control, address, strobe and other signals onto the bus, and are configured to capture the various data signals. At least the strobe signals are continuously driven on the bus 24 by drivers (not shown) associated with either the first agent 22 or the second agent 26. In general, when the last strobe signal from the first agent is received, the second agent proceeds to source-synchronously turn On its driver. When data or strobes are expected from the second agent, the drivers of the first agent are to be synchronously turned Off.

In an implementation, the first agent 22 may be a processor, the second agent 26 may be a cache, and the bus 24 may be a back-side cache bus (BSB). These components may be included on a single integrated circuit chip or may be separate components located on different chips. Both the processor and cache include drivers and receivers for driving signals onto, and receiving signals from, the BSB. It should be understood, however, that the novel processes and circuitry described below could be implemented in other interface bus configurations that do not employ a BSB. Furthermore, although the example implementation described below includes a center-tapped terminated (CTT) bus, any type of parallel termination bus circuitry could be used. In addition, unless otherwise noted, references to drivers may include both data drivers and strobe drivers.

Receivers depend upon the BSB signal integrity to be such that a strobe signal transition will not be detected when one is not occurring. If a strobe signal is permitted to float on the BSB, then signal integrity may be compromised. A fatal system error may then occur that may require an undesirable re-boot of the processor. One circumstance that may cause a strobe signal to float is when there is a bus master changeover, defined as when the processor stops driving signals and the cache starts driving signals, or vice-versa. If a strobe signal, for example, is left to float to an undetermined value, then the logic or the circuit located after the receiver may begin malfunctioning. Even if a receiver is not expecting to acquire data, if a strobe signal or any other signal is permitted to float on the BSB then power will be wasted because of the large crowbar current in the receiver.

Figure 3:
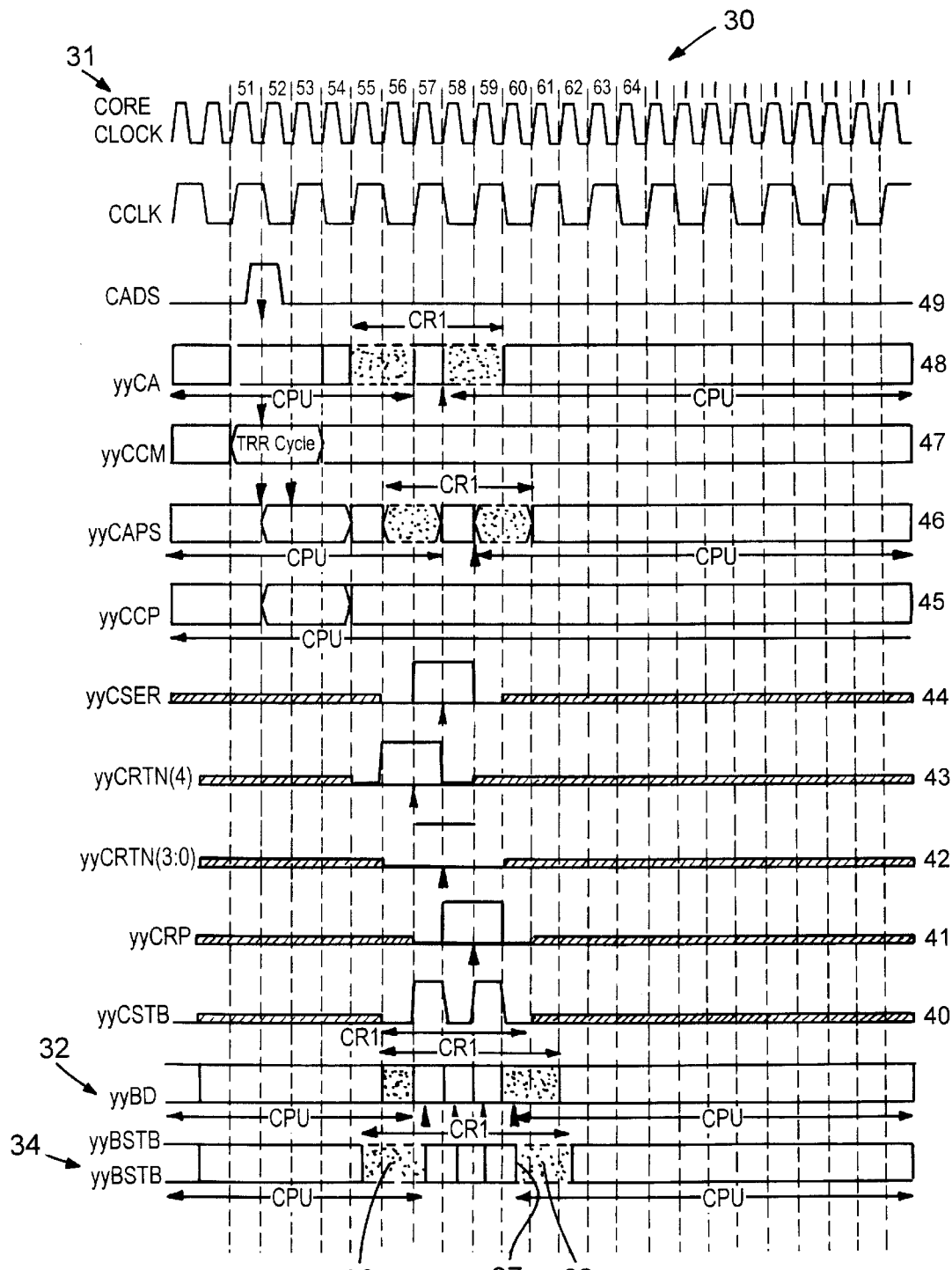
FIG. 3 is a timing diagram of a back-side bus (BSB) center-tapped terminated (CTT) protocol read cycle in a zero transmission line delay environment.

FIG. 3 is an illustrative implementation of a timing diagram 30 of a BSB, CTT protocol read cycle in a 1:1 ratio of the processor core clock 31 to the BSB strobe signals in a zero transmission line delay environment. This environment allows signals to be described in an idealized manner where propagation delays are ignored. The 1:1 ratio of the core clock 31 to the data strobes has been chosen here for ease of understanding, and indicates that the switching speed is substantially simultaneous. It should be understood that other ratios could be used, and that in real world operation, the ratio could be different and the line delay may be significant.

Referring to the example transactions of FIG. 3, the data signals 32 and strobe signals 34 are bi-directional signals between the processor and the cache. The CTT protocol for the cache regarding data signals 32 specifies a pre-drive window 36 and a post-drive window 38 of 2 clock cycles for the strobe signals 34. The pre-drive and post drive windows are designed to prevent a signal from floating on the BSB during a master changeover by ensuring drive overlap between the masters on the BSB even at the highest possible operating frequency and over an entire operational range of frequencies. As frequency increases, so does the transmission line delay in terms of clock cycles, which causes the drive overlap to diminish and may cause the drive overlap to disappear. If the drive overlap disappears then a strobe signal may float on the BSB. Another possible situation that may cause a strobe signal to float is when the cache responds back-to-back to a request for data with a spacing that results in a non-overlap condition of the post-drive signal from the first reply and the pre-drive signal of the second reply. This case should be recognized so that the processor will drive a signal on the BSB to prevent a strobe signal floating condition.

A CTT protocol requires that both the bi-directional data signals 32 and strobe signals 34 be continuously driven on the BSB by the processor or the cache. On reception of the "last strobe" signal for a particular transaction, the processor should asynchronously (source-synchronous with the strobe) turn On its driver. The "last strobe" signal may be defined as the strobe signal for a transaction that is not closely followed by strobe signals of another transaction, which concept will be explained in more detail below with reference to FIG. 4. In FIG. 3, the last strobe signal is depicted at 37. When the processor next expects to receive data and/or strobe signals from the cache, then it should synchronously turn its drivers Off. Thus, the processor cut-off points should be synchronously timed to occur at the earliest time that the processor expects to receive data on the BSB. Although in theory this seems simple to accomplish, under actual system operating conditions it is difficult to establish if a particular strobe signal edge is the "last strobe" that requires generation of a latch-back signal. In the following discussion, the latch-back signal is defined as the signal resulting from a latch-back process which occurs when a receiving agent captures the value on the bus from the transmitting agent, for use in driving it back on the bus if required. The described technique can also be used to prevent signals from floating on a unidirectional bus or signal line.

Referring again to FIG. 3, when the system is first turned On, the processor chip will drive strobe signals 34 and data signal 32 on a bi-directional bus. The cache will drive strobe signals 40 on a unidirectional bus. The processor knows when to capture data 41 to 44 from the cache based on the cache strobe signals 40. Thus, at power-up the processor drivers and cache drivers send off strobe signals so that there are no concerns about floating signals. But, when a changeover of control is to occur, then care must be taken in most cases to insure that a signal does not float on a bus. However, there are cases when no special handling is required, such as when the last of the strobe signals 40 arrives, because the cache will drive that signal low and prevent any system failures. In other cases where a strobe floats, then one of the agents, such as a cache, may be able to reset itself before any further requests are made, which would correct any problems caused by floating signals.

Figure 4A:
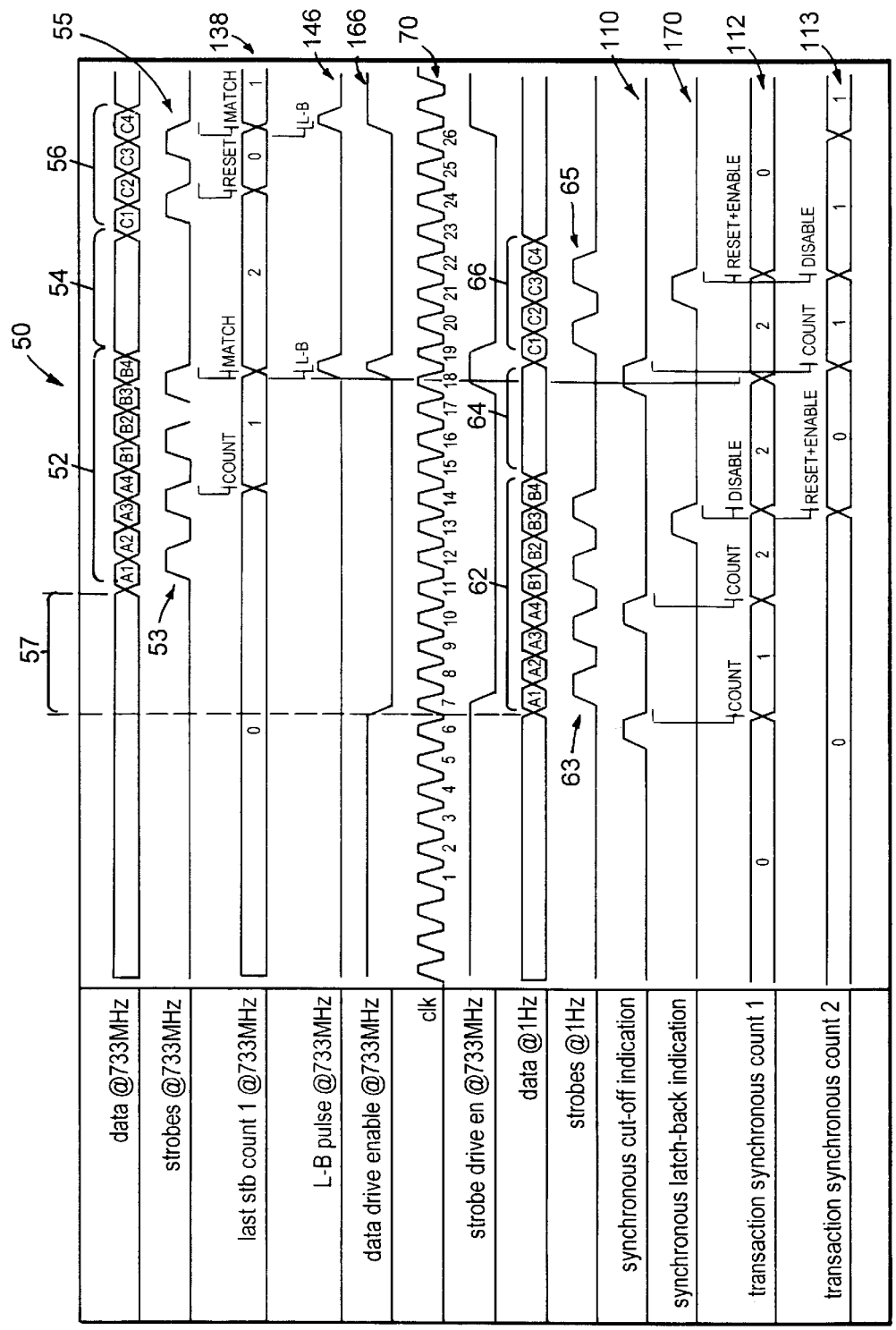
FIG. 4A is a timing diagram to illustrate CTT cut-off and latch-back operation according to the invention.

FIG. 4A is a timing diagram 50 illustrating CTT protocol cut-off and latch-back operation signals for a processor and a cache when operating at two extremes: the processor reading data at a high frequency (in this example 733 Megahertz (MHz)) and at a low frequency (in this example 1 Hertz (Hz)). In the case of high frequency operation, data signals 52 designated as A1–A4 and B1–B4 are followed after a delay 54 by data signals 56 designated as C1–C4. Included with the data signals are counterpart strobe signals 53 and 55, which may be differential signals (e.g. one is active high and the other is active when low) to increase system reliability and performance. For low frequency operation, data signals 62 designated as A1–A4 and B1–B4 are followed after a delay 64 by data signals 66 designated C1–C4. Again included are counterpart strobe signals 63 and 65. The interval 57 is the additional transmission line delay in terms of clock cycles when operating at the higher frequency (which in this example is about 4 clock cycles) as calculated by an equation: transmission line delay divided by the core clock period.

The clock signal 70 indicates that in low frequency operation it took 6 cycles from the time a cache read transaction was requested to when the first data block A1 of data signals 62 arrives at the processor assuming the transaction began at clock cycle one. Thus, the cache latency for the data signals 62 is 6 cycles. For high frequency operation, referring to the data signals 52, the cache latency is 10 cycles. Therefore, for different operating frequencies the cache latency will be different and reception of data will occur during different clock cycles. For example, comparing back-to-back read transactions at the frequencies, the last data chunk B4 of data signals 62 and the data chunk A4 of the data signals 52 could be received roughly at the same time (during clock cycle fourteen). If the data chunks C1 to C4 did not exist, then in the case of low frequency operation the processor should perform a latch-back operation at about clock cycle fourteen, while in the case of high frequency operation the processor should perform a latch-back operation at about clock cycle 18.

The spacing between transactions also affects whether or not the processor should perform a latch-back operation. For example, FIG. 4A shows that a time spacing 54 or 64 between data chunks that is less than four (4) clock cycles typically allows enough time for the cache pre-drive and post-drive strobe signals to overlap, assuming a two clock cycle of pre-drive and a two clock cycle of post-drive, and thus the latch-back should not be done. Since the post-drive signal after data chunk B4 is two cycles and the pre-drive signal before data chunk C1 is two cycles, there will always be an overlap signal or a known value on the BSB. However, the two groups may be handled by different cache banks, and if the first cache bank responds faster than typical or expected (due to manufacturing deviations, or run time effects resulting from voltage deviations, etc.) while the second cache bank responds slower than expected, then there will be no overlap and the processor has to perform a latch-back operation to prevent a strobe signal from floating on the BSB.

The driver cut-off and latch-back circuitry must also be able to operate from a very low frequency (~0 Hz) up to the fastest operating frequency of the processor. This frequency independent requirement is required to allow smooth manipulation of the integrated circuit in the test environment and to ensure that components will function in production. This requirement is met by ensuring that the processor driver cut-off is initiated at the same clock edge (synchronously) as the cache response. Since this response depends on cache latency that may not be the same on different system configurations, some flexibility may be introduced by including a knob called "cut-off knob". A knob may be defined as an adjustment mechanism for setting control values in a semiconductor chip. A knob may be hardware or software based, and is used to change the behavior of the processor integrated circuit chip. The cut-off knob may be tied to a cache latency knob operable to adjust for fast or slow cache response time. The cut-off knob is preferably software based to facilitate adjustment of the processor once the cache latency is known for a particular system. Systems may have different knob settings to ensure frequency independent, fully-configurable operation of the cut-off and latch-back operations. Multiple knobs may be needed to control cut-off points for different signals.

Figure 4B:
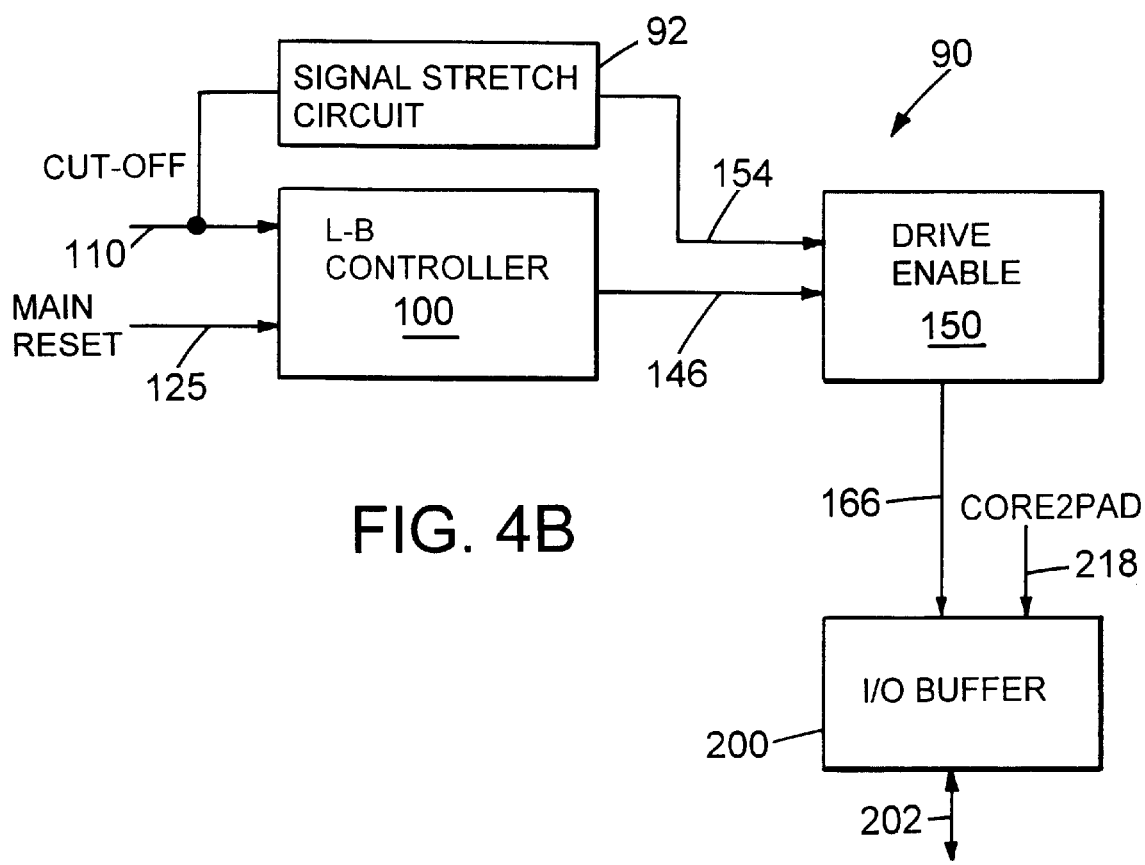
FIG. 4B is a block diagram of a system according to the invention for driving a signal onto the BSB.

FIG. 4B is a simplified block diagram of a system 90 for driving a signal onto the BSB when required. A latch-back controller circuit 100 includes a BSB cut-off signal input 110 and a main reset input 125, and operates to generate a latch-back pulse on line 146 to a drive enable circuit 150. Signal stretch circuitry 92 operates to provide a stretched BSB cutoff signal input on line 154 to the drive enable circuit 150 (which will be explained below with reference to FIG. 6), and a drive enable signal is generated on line 166 for an input/output buffer circuit 200. The input/output circuit 200 generates a signal having a particular value on input/output PAD 202 for driving onto the BSB, and includes a CORE2PAD input line 218. The CORE2PAD is a line that connects a processor core to the bus line. Implementations of the latch-back controller circuit, drive enable circuit and input/output buffer circuit are described below with regard to FIGS. 5 to 7.

Figure 5:
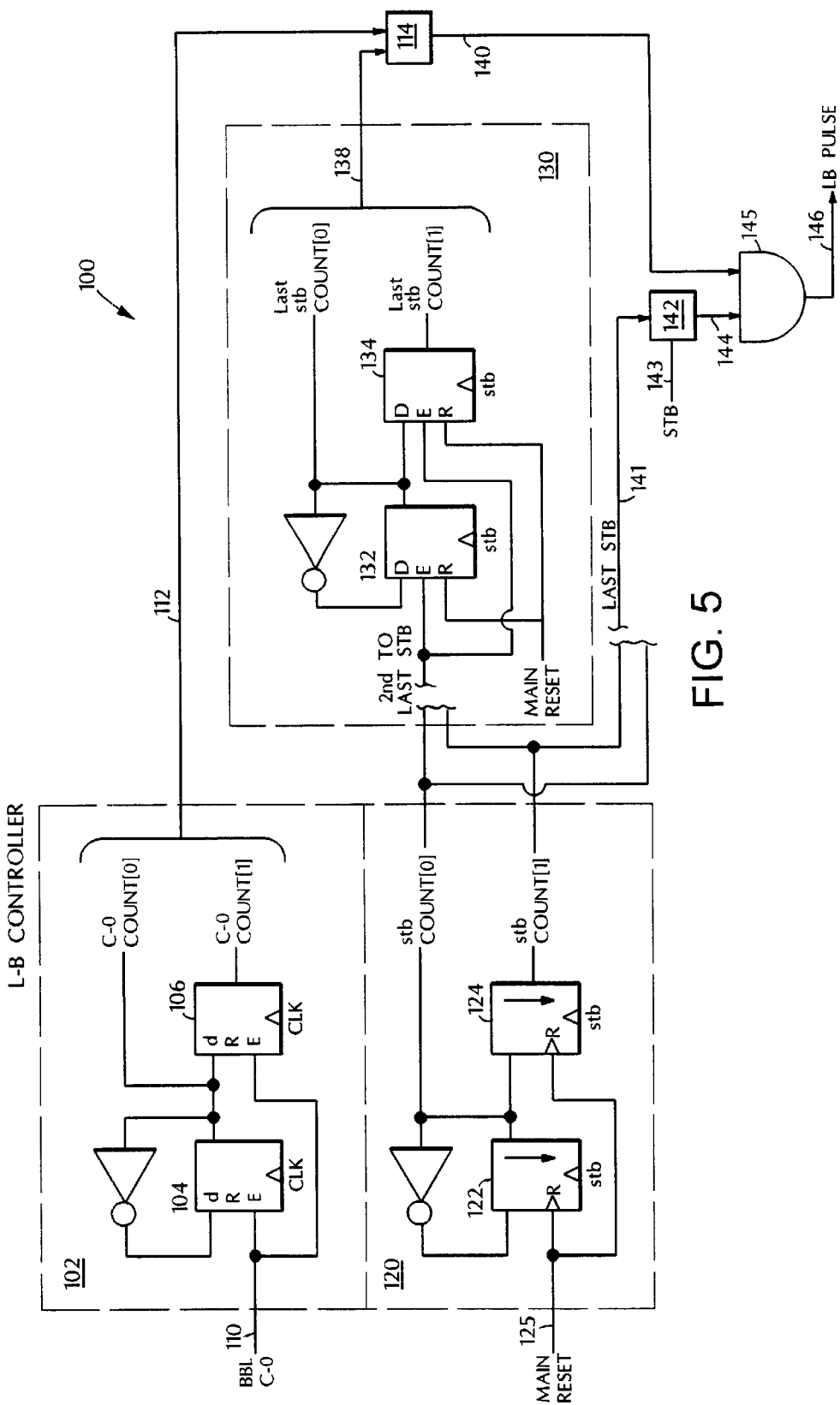
FIG. 5 is a block diagram of a latch-back controller according to the invention.

FIG. 5 is a block diagram of an implementation of a latch-back controller circuit 100 which may be implemented as a part of a processor. The latch-back controller circuit operates to count the requests that have been issued and to count the replies received, and when these counts are equal then it issues a latch-back instruction. The latch-back controller includes a synchronous BSB cut-off counter circuit 102, and two source synchronous strobe counter circuits 120 and 130. The BSB transaction counter circuit 102 keeps track of issued processor transactions, and the source synchronous counter circuits 120 and 130 keep track of cache-replies that have been received for those transactions.

In the present implementation, the BSB transaction counter circuit 102 is a two-bit counter that includes a first core clocked flip-flop 104 and a second core clocked flip-flop 106, each having data, reset and enable inputs. A BSB cut-off signal is fed on line 110 to both flip-flops, and the circuit 102 operates to count the number of cut-off signals and output the count on line 112 to a comparator circuit 114. Cut-off signals are sent by the core some number of clocks after each and every transaction is initiated on the bus. Also, a latch-back indication is sent every time the core recognizes that the separation between two transaction groups is large enough for a latch-back to take place. The core may be defined as the actual logic circuitry of the semiconductor chip processor.

Referring again to FIG. 5, the two-bit counter circuit 120 includes two asynchronous flip-flops 122 and 124 running source-synchronously on the strobe. It should be understood that implementations including other than two-bit counters and more or less than two flip-flops could be utilized. After a main reset signal is received on line 125, the circuit 120 counts each strobe toggle, and the count is input to the two-bit counter circuit 130. The circuit 130 includes two asynchronous reset flip-flops 132, 134 which generate a count of the last strobe on line 138 which is input to the comparator 114. The output of the comparator 114 is fed on line 140 to And circuit 145, which also is connected to line 144. Referring to both FIGS. 4A and 5, if the count of the cut-off signals (issued transactions) on line 112 equals the last strobe count (count of replies received) on line 138, then the signal on line 140 allows an edge signal 144 to be propagated on line 146. The last strobe signal on line 141 is computed on the edge prior to the last edge of a full set of strobes, and this computation is done to ensure speed of latch-back pulse generation. The signal on line 140 is stable because the circuit 102 is locked or frozen when a latch-back indication is received from the core. The edge signal 144 is therefore generated at the last strobe edge of the cache reply by a pulse generator circuit 142 which uses the strobe as an input 143. The output 146 is zero (ground) most of the time, except when the latch-back is to be done. An active signal on line 140 indicates that the number of transactions issued and replies received is equal. When that occurs, then a latch-back is done by the processor on the BSB. The count gets reset again during the reply following the transaction that caused a latch-back to occur. This is done so that it is feasible to do a latch-back for the following transaction as well.

Multiple cut-off counter circuits (102) may be needed if transactions can be issued before the latch back for outstanding transactions occurs. Thus, outstanding cache transactions are tracked as data is being transferred with at least one of the counters. For example, if two counter circuits are used, the counters would alternate every time the core sends a synchronous latch-back indication 170 (FIG. 4A), the old counter indication 112 freezes its value, while the new counter indication 113 resets itself and enables itself to count cut-off signals. When data is transferred from the cache to the processor over the BSB, the transaction is tracked with the source synchronous counter circuit 120. When the synchronous counter and the source synchronous counters match, a signal is driven on the BSB to ensure that no signals are permitted to float. Thus, as transactions return data, latch-back is only performed when the synchronous and source synchronous counters match, and the latch-back controller issues a latch-back pulse (L-B Pulse) on the last edge of an incoming strobe signal.

Figure 6:
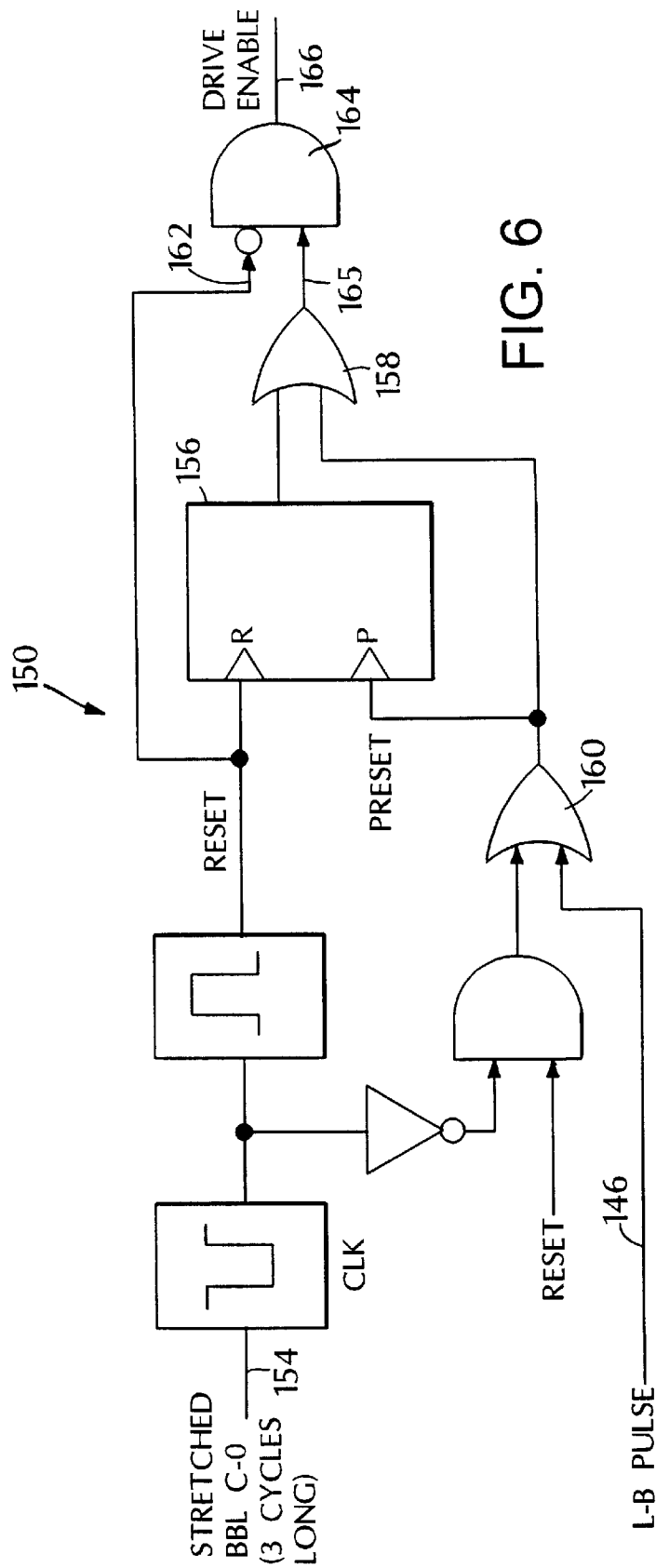
FIG. 6 is a block diagram of a drive enable circuit according to the invention.

FIG. 6 is a block diagram of a drive enable circuit 150. An asynchronous reset-preset flip-flop 156 operates to produce a zero or low output when the reset signal is high, and a one or high output when the preset signal is high. The reset-preset flip-flop 156 also operates as a priority flip-flop to generate a zero or low output if the reset signal and the preset signal are both simultaneously high. A drive enable output on line 166 (see also FIG. 4A) determines whether or not the processor is to drive a signal on the BSB. The drive enable circuit 150 receives the latch-back pulse on line 146 and a synchronous cut-off indication signal on line 154 for turning Off the strobe and/or the data drive enable signal. The same BSB cut-off signal that is input to the BSB strobe counter circuit 102 of FIG. 5 on line 110 is input on line 154 and each cycle is stretched to a 3 cycle duration to ensure that the BSB is cut-off even after a substantially simultaneous preset indication occurs at the same time as a reset indication. The asynchronous preset-reset latch 156 is connected to an OR circuit 158, which also is connected to the latch-back pulse through OR circuit 160. The inverse of the stretched and latched BSB cut-off signal is input on line 162 to AND circuit 164 along with the output 165 of OR circuit 158.

The complexity of the drive enable circuit 150 of FIG. 6 is required because there are cases when it appears that a latch-back should be done but a cut-off indication arrives in time to prevent it. In addition, the drive enable circuit ensures that the BSB will not float because a cache reply included an insufficient drive overlap. The latter case could occur, for example, if first and second cache chips each reply to two consecutive requests (bank switch) of data and the strobe signals do not overlap, then a latch-back pulse is generated and should result in the drive enable being turned on, at least temporarily, to prevent a signal from floating on the BSB. The cut-off pulse should have priority over the latch-back pulse so that no signal is driven onto the BSB a certain number of clocks following an issued transaction. In the bank switch case, the cut-off for the second transaction ensures the processor turns off before the second reply is received. Similarly, if a latch-back indication and a cut-off indication occur simultaneously, then the cut-off pulse should have priority. The drive enable circuit 150 ensures that cut-off indications are prioritized over latch-back indications, allowing for the processor to drive a signal even for very short intervals when the cache pre-drive signals and post-drive signals do not overlap. Therefore, the drive enable circuit handles cases that may occur during system operation wherein apparently contradictory signals are generated.

Figure 7:
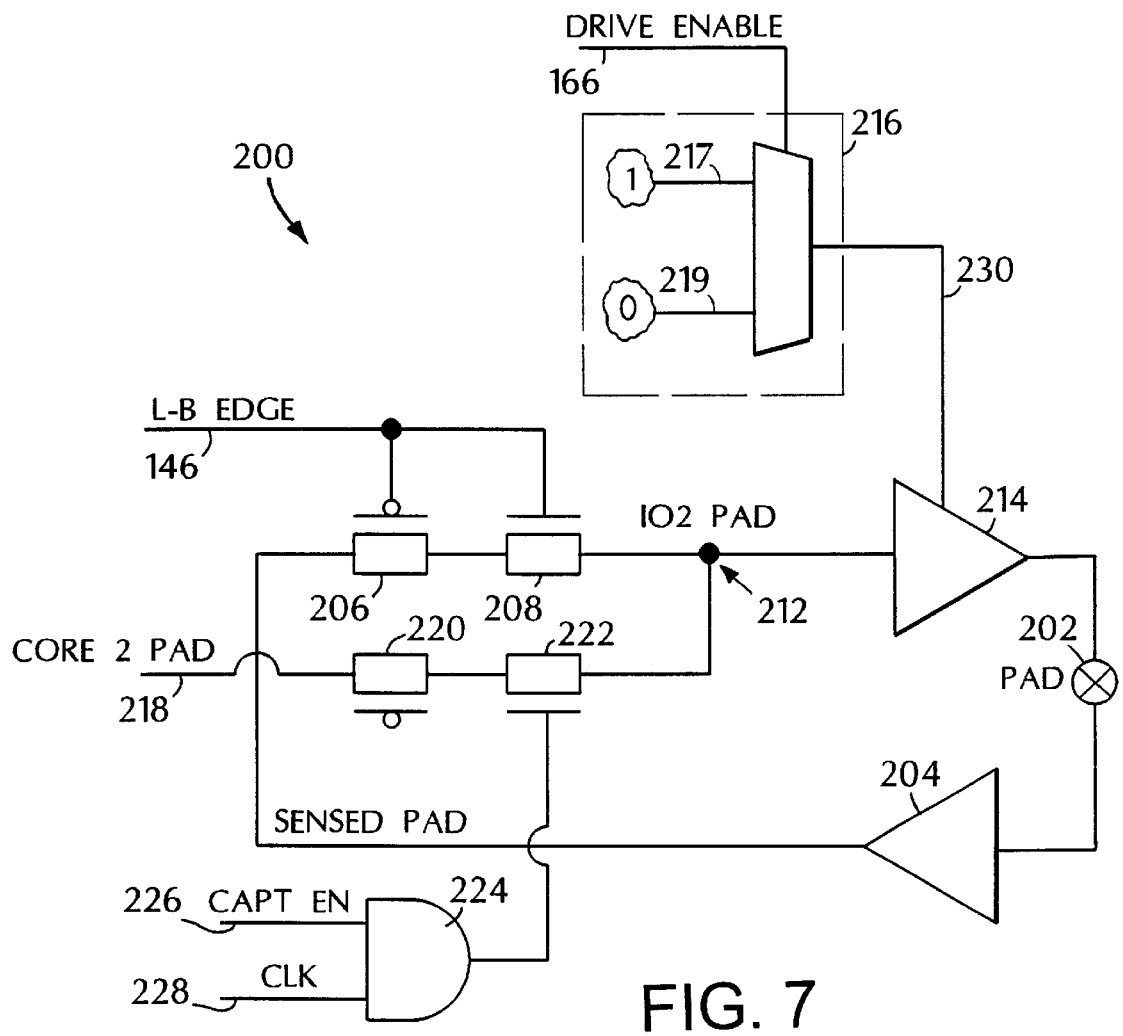
FIG. 7 is a block diagram of an input/output buffer circuit according to the invention.

FIG. 7 is a block diagram of an input/output buffer circuit 200 illustrating how the latch-back pulse and drive enable signal are used to ensure correct functioning of the BSB. When the cache stops driving and the processor should start driving in the absence of further transactions, the value on the bus at the time (which the cache was driving) should be used. The circuit 200 operates to capture that value for such use.

Referring to FIG. 7, the PAD 202 indicates the actual wire connecting the processor to the cache. Thus, the value of the last signal from the cache will appear at this point and will be placed in a buffer 204, which is connected to latches 206, 208. The latches 206 and 208 are clocked by the latch-back signal on line 146 output from the latch-back controller circuit 100 of FIG. 5. Thus, when a latch-back pulse signal is issued, then the value of the signal at 202 is latched into IO2 PAD 212. The buffer 214 will then drive the signal value onto 202 when a drive enable signal on line 230 is On (which is generated from a drive enable signal on line 166, the output of drive enable circuit 150 of FIG. 6). A multiplexer circuit 216 operates to quickly drive a signal onto line 230 indicating a drive enable to turn On buffer 214 when required. The inputs on lines 217 and 219 to the multiplexer circuit are pre-generated based on a multiplicity of possible system conditions that could occur to guarantee that the drive signal will be present to turn On the buffer 214 only when required. The pre-generated input signals on lines 217 and 219 result from transforming logic circuitry corresponding to all of the possible input variables and output permutations so that the drive enable signal on line 166 is a trial (multiplexer control) signal, and the drive enable signal does not have to propagate through a large cone of logic. This functionality may require an increase in hardware to model each of the possible signal conditions, but it is worth this cost in order to provide the speed needed to ensure the fastest attainable BSB operation while ensuring correct operation under a plurality of conditions. The processor therefore will drive a signal on the BSB via PAD 202 of the same value as the signal the cache had been driving when required.

In addition to operating in the manner described above, FIG. 7 may operate to drive out a Core2Pad signal present on line 218 onto the PAD 202. Line 218 originates from the chip core for data writes, and is connected to latches 220 and 222. The latch 220 is clocked by the core clock, and the latch 222 is clocked by the output of an AND circuit 224. The AND circuit has a Capture Enable input 226 and a clock input 228. The Capture Enable input 226 is controlled by the processor and operates to send the value of the Core2Pad signal on line 218 to IO2PAD 212 only when the drive enable signal on line 226 is present which only occurs when the processor intends to do a data write, thus preventing any contention to write a value onto IO2 PAD. Thus, the captured last value is only driven out onto the BSB when needed. In summary, when a latch-back occurs, the current value on the BSB is sampled in the IO2Pad node 212 and it is driven out. When the BSB wants to drive strobes and/or data out, it does so through the Core2Pad 218 to IO2Pad 212 path. A carefully controlled capture Enable signal ensures that no contention occurs in the IO2PAD bus node.

Figure 8:
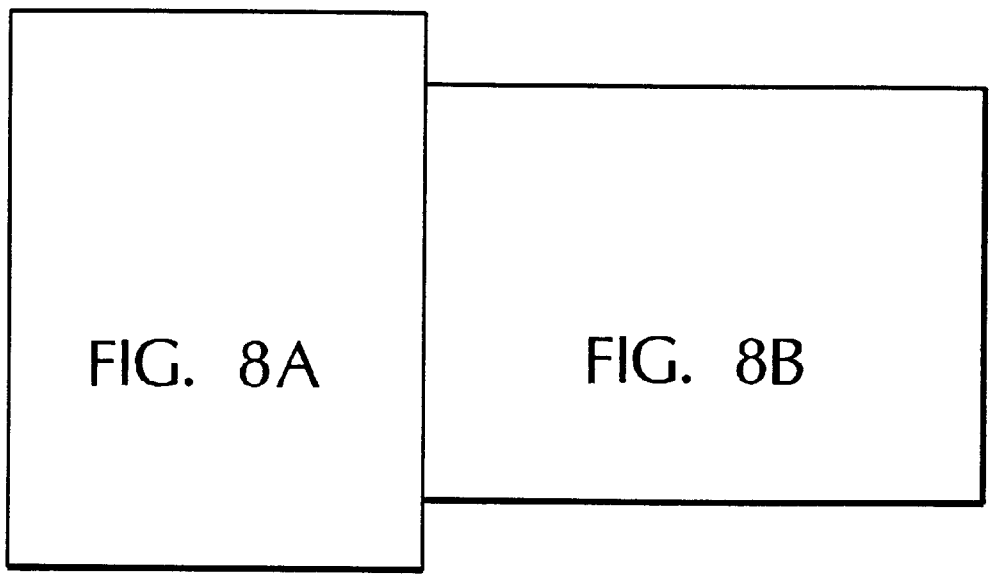
FIG. 8 is a schematic diagram of an implementation of a CTT controller.
Figure 12:
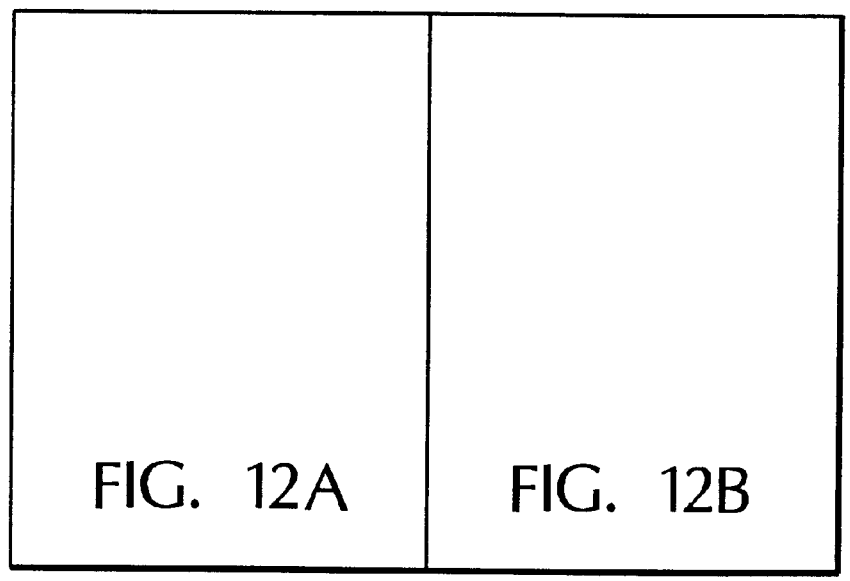
FIGS. 12 and 13 are circuit diagrams of an implementation of an Input/Output buffer control circuit and a logic control circuit.
Figure 8A:
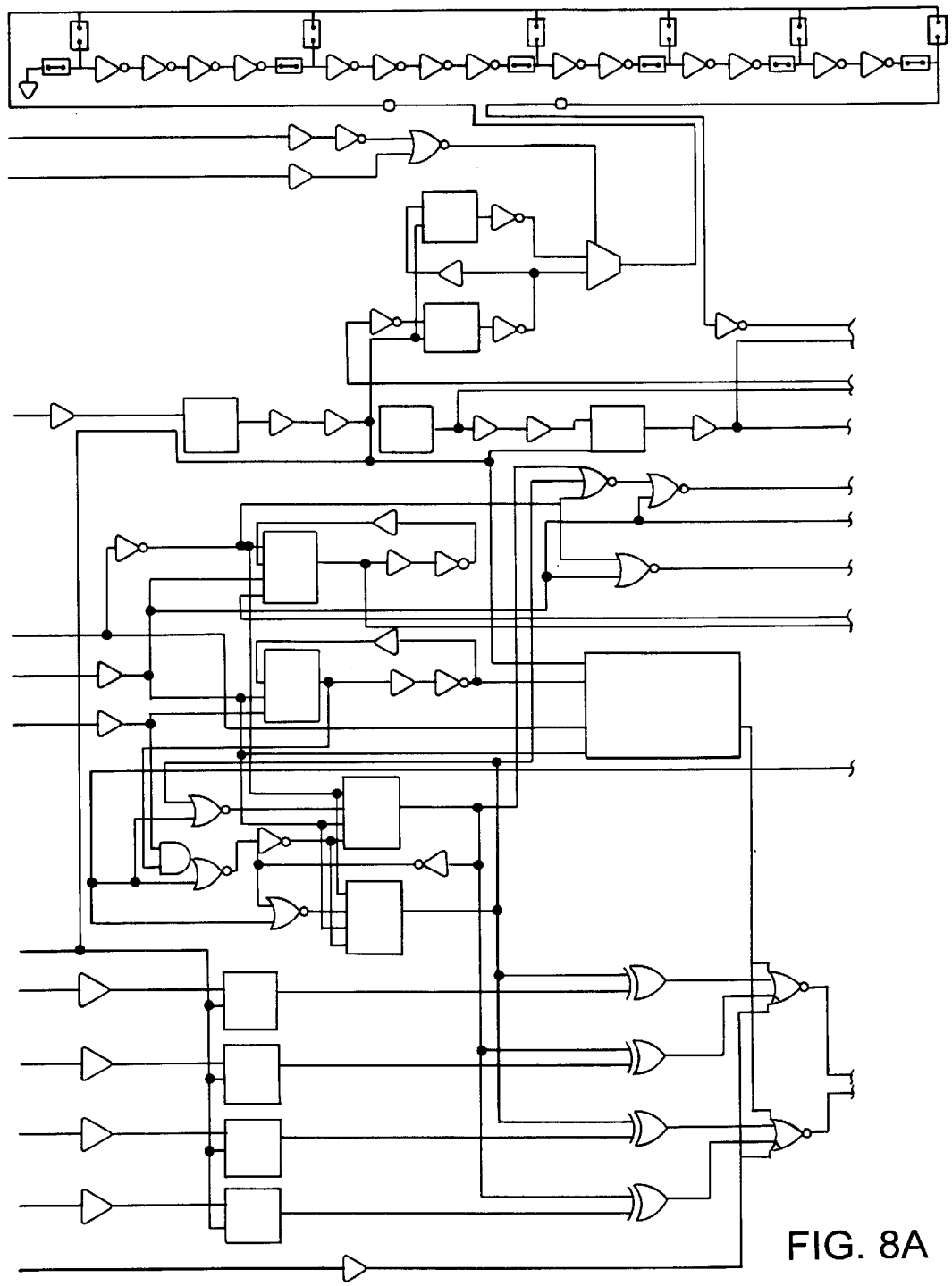
Figure 8B:
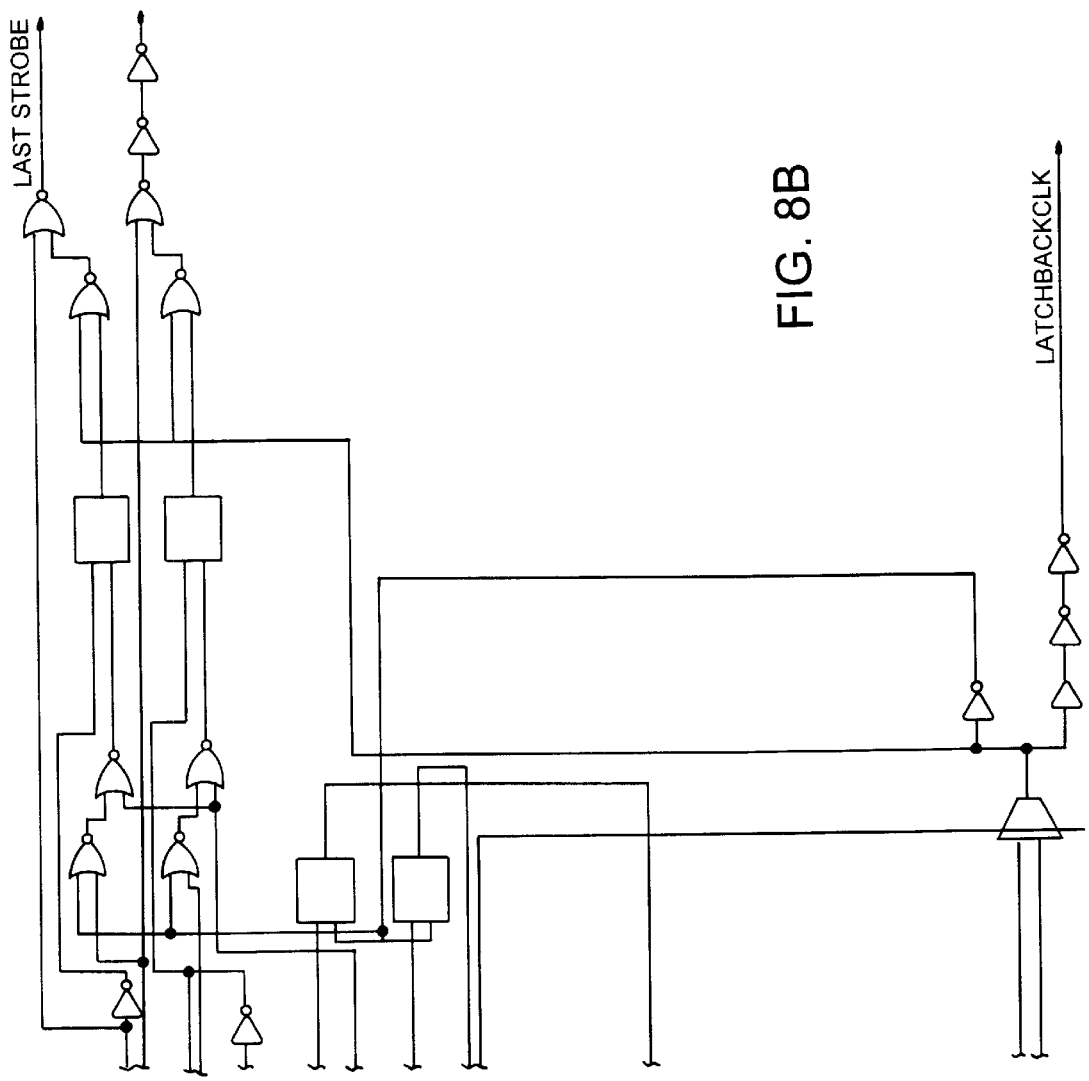
Figure 9:
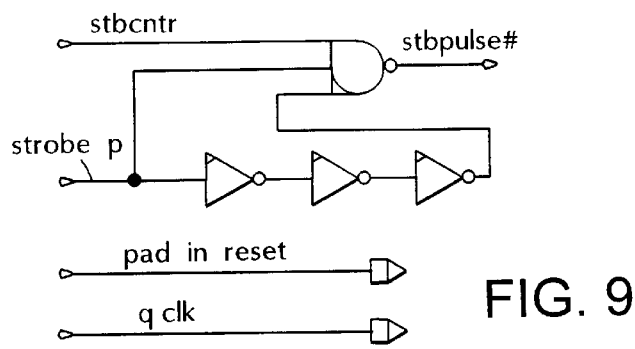
FIG. 9 is an implementation of a strobe pulse generation circuit.
Figure 10:
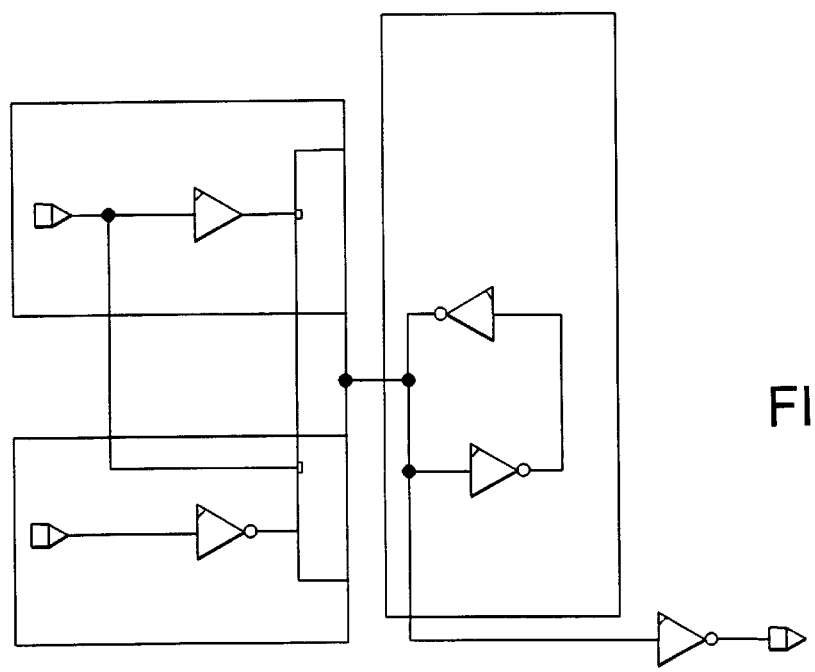
FIGS. 10 and 11 illustrate implementations and of a preset-reset priority flip-flop.
Figure 11:
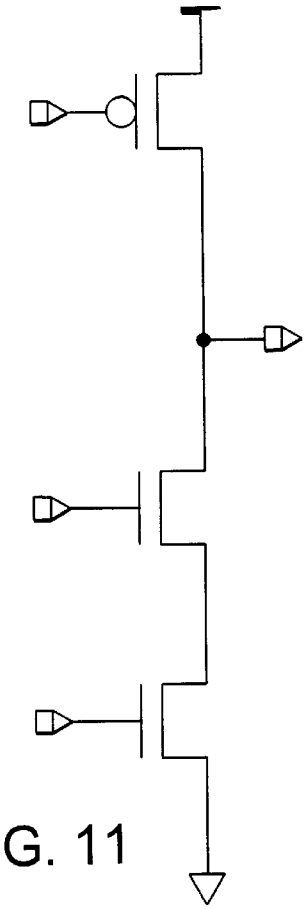
Figure 12A:
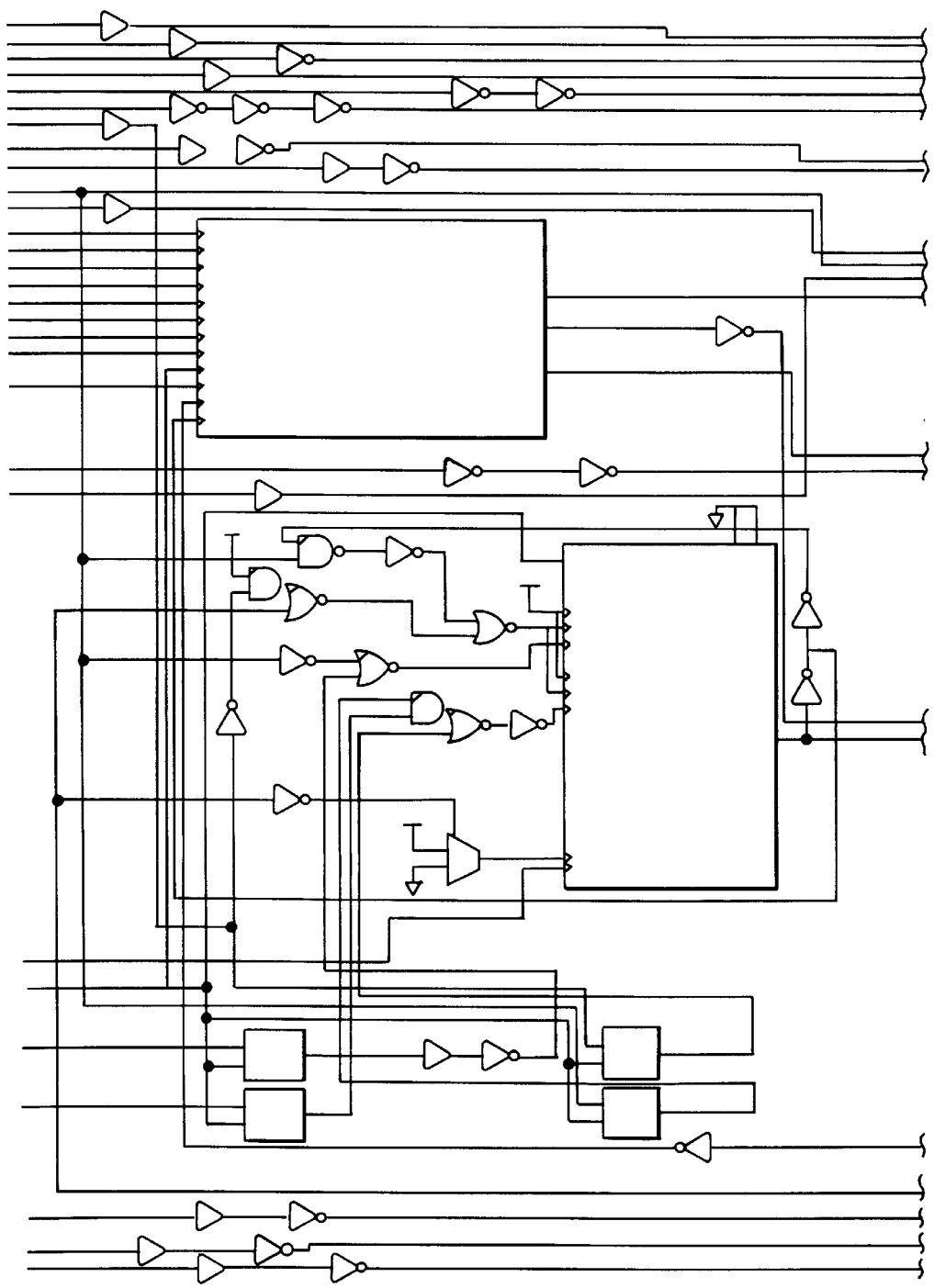
Figure 12B:
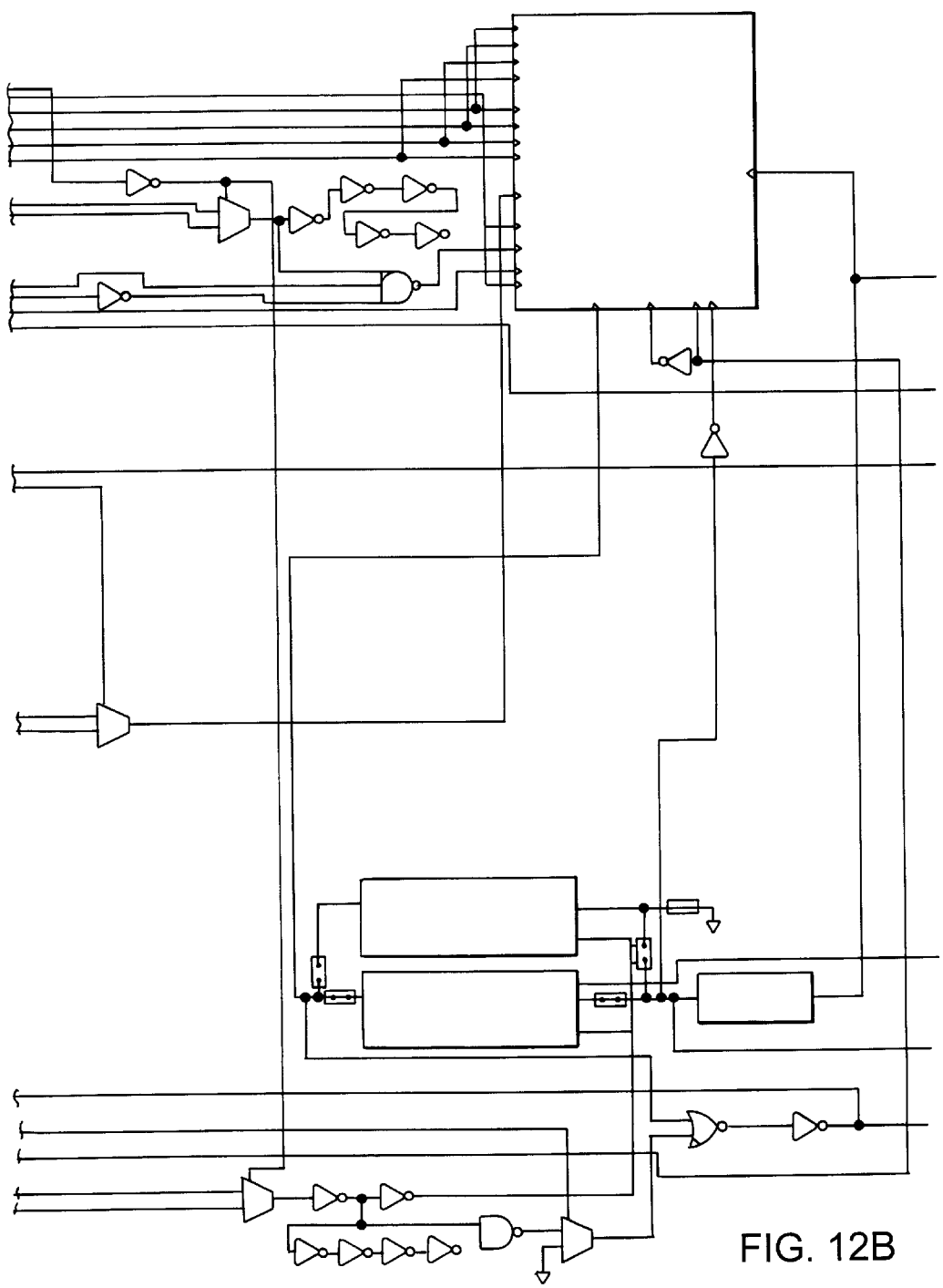
Figure 13:
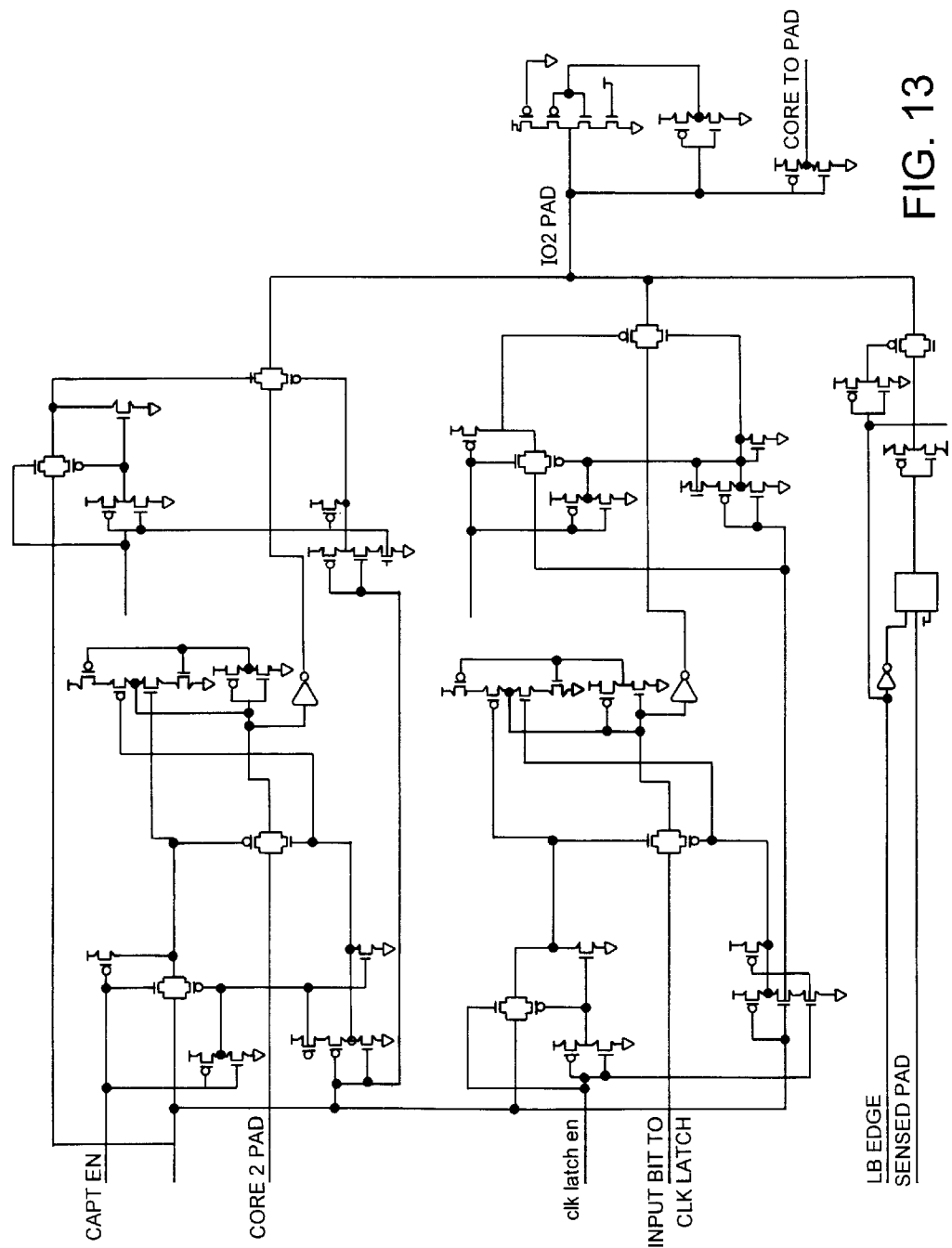

FIG. 8 is a CTT controller schematic diagram of an implementation of latch-back controller circuitry and drive enable generation circuitry described above with reference to FIGS. 5 and 6. FIG. 9 is an implementation of a strobe pulse generation circuit. FIGS. 10 and 11 illustrate implementations and of a preset-reset priority flip-flop. FIGS. 12 and 13 are circuit diagrams of an implementation of an Input/Output buffer control circuit and a logic control circuit. FIG. 13 illustrates how the ratio logic controls the flow of data from "Core2Pad" and "SensedPad" to "IO2Pad".

The described techniques turn On and Off the processor drive enables in such a way as to ensure that the strobe signals and/or data signals on the BSB are never left to float. The techniques and circuit implementations according to the invention also significantly reduce the occurrence of inter-symbol interference (ISI) in the bus that connects together various entities that drive and receive signals.

It is to be understood that while certain implementations of the invention have been described, other aspects, advantages, and modifications are within the scope of the following claims.

What is claimed is:

1. A method comprising:
    transferring data between a first agent and a second agent over a parallel terminated bus;
    tracking outstanding data requests from the first agent to the second agent with at least one synchronous counter;
    tracking outstanding data replies from the second agent with a source synchronous counter; and
    driving a signal on the parallel terminated bus when the synchronous and source synchronous counters match.

2. The method of claim 1, further comprising sending cut-off signals after a preset number of clock cycles after each transaction is initiated by a core on the parallel terminated bus.

3. The method of claim 1, further comprising performing a latch-back operation to prevent the parallel terminated bus from floating.

4. The method of claim 3, wherein a latch-back operation occurs when a core recognizes that there will be no overlap between post-drive and pre-drive signals of two transaction groups.

5. The method of claim 3, wherein the latch-back operation occurs when the spacing between transaction groups is greater than a predetermined number of cycles.

6. The method of claim 5, wherein the predetermined number of cycles is a function of the number of pre-drive and post-drive cycles.

7. The method of claim 3, wherein replies are no longer tracked when a latch back indication is received.

8. The method of claim 1, further comprising capturing the last value present on the parallel terminated bus in case a latch-back operation is required.

9. The method of claim 1, further comprising utilizing a knob to adjust a processor drive operation.

10. The method of claim 9 wherein the knob is used to adjust at least one of a processor drive cut-off operation and a processor drive latch-back operation.

11. The method of claim 1, further comprising performing a latch-back operation when a bus agent recognizes that there will be no overlap between post-drive and pre-drive signals of two transaction groups.

12. The method of claim 1, further comprising performing a latch-back operation when the spacing between transaction groups is greater than four clock cycles.

13. A method for operating a computer system comprising:
   transferring data between a processor and a cache over a parallel terminated bus;
   tracking data requests from the processor to the cache with at least one synchronous counter;
   tracking data replies from the cache with a source synchronous counter; and
   driving a signal on the parallel terminated bus when the synchronous and the source synchronous counters match.

14. The method of claim 13, further comprising sending cut-off signals from the processor after a preset number of clock cycles after each transaction is initiated.

15. The method of claim 13, further comprising performing a latch-back operation to prevent the bus from floating.

16. The method of claim 15, wherein the latch-back operation is performed when the processor recognizes that there will be no overlap between post-drive and pre-drive signals of two transaction groups.

17. The method of claim 15, wherein the latch-back operation occurs when the spacing between transactions is greater than a predetermined number of clock cycles.

18. The method of claim 17, wherein the predetermined number of clock cycles is a function of the number of pre-drive and post-drive cycles.

19. The method of claim 15, wherein replies are no longer tracked when a latch-back indication is received.

20. The method of claim 13, further comprising capturing the last value present on the bus in case a latch-back operation is required.

21. The method of claim 13, further comprising utilizing a knob to adjust control values associated with system performance.

22. The method of claim 21, wherein the knob comprises at least one of a cut-off knob and a latch-back knob.

23. The method of claim 13, further comprising performing a latch-back operation when the processor recognizes that there will be no overlap between post-drive and pre-drive signals of two transaction groups.

24. The method of claim 13, further comprising stopping the tracking of replies when a latch-back indication is received from the processor core.

25. A parallel terminated system comprising:
   a first agent;
   a second agent; and
   a parallel terminated bus coupling the first agent to the second agent, wherein the first and second agents are capable of driving data, control, strobe and other signals onto the bus, wherein at least one of the agents drives at least the strobe signals continuously onto the bus to ensure that a signal will not float, and wherein at least one agent comprises:
   a latch-back controller;
   a drive enable circuit connected to the latch-back controller; and
   an input/output buffer circuit connected to the drive enable circuit and to the bus, for driving a signal onto the bus when required.

26. The system of claim 25, wherein the latch-back controller further comprises:
   at least one synchronous strobe counter for tracking the first agent transactions;
   first and second source synchronous counter circuits for tracking outstanding second agent replies;
   a comparator circuit connected to the source synchronous strobe counter and to the first and to the second synchronous counter circuits; and
   an And circuit connected to outputs of the comparator and of the first synchronous counter circuit, for generating a latch-back pulse.

27. The system of claim 25, wherein the drive enable circuit comprises an asynchronous reset-preset priority flip-flop.

28. The system of claim 25, wherein the input/output buffer circuit comprises:
   a multiplexer circuit connected to the drive enable circuit; and
   a plurality of buffers for storing and releasing a value that appeared on the bus or another value depending upon instructions from a processor core.

29. Circuitry for a processor based system, comprising;
   a latch-back controller;
   a drive enable circuit connected to the latch-back controller; and
   an input/output buffer circuit connected to the drive enable circuit and to a parallel terminated bus, for driving a signal onto the bus when required to ensure that a signal will not float on the bus.

30. The system of claim 29, wherein the latch-back controller comprises:
   at least one synchronous strobe counter for tracking processor transactions;
   first and second source synchronous counter circuits for tracking outstanding cache replies;
   a comparator circuit connected to the source synchronous strobe counter and to the first and to the second synchronous counter circuits; and
   an And circuit connected to outputs of the comparator and of the first synchronous counter circuit, for generating a latch-back pulse.

31. The system of claim 29, wherein the drive enable circuit comprises an asynchronous reset-preset priority flip-flop.

32. The system of claim 29, wherein the input/output buffer circuit comprises:
   a multiplexer circuit connected to the drive enable circuit; and
   a plurality of buffers for storing and releasing a value that appeared on the bus or another value depending upon instructions from a processor core.

* * * * *

UNITED STATES PATENT AND TRADEMARK OFFICE
CERTIFICATE OF CORRECTION

PATENT NO. : 6,519,664 B1
DATED : February 11, 2003
INVENTOR(S) : Alper Ilkbahar, Harry Muljono and Pablo M. Rodriguez It is certified that error appears in the above-identified patent and that said Letters Patent is hereby corrected as shown below:

<u>Title page,</u>
Item [75], Inventors, please correct the spelling of the inventors names as follows:
-- Alper Ilkbahar, Harry Muljono, and Pablo M. Rodriguez. --

Signed and Sealed this

Sixth Day of April, 2004

JON W. DUDAS
*Acting Director of the United States Patent and Trademark Office*